Sept. 25, 1945. S. H. WEBSTER 2,385,480
MILITARY VEHICLE
Filed Jan. 17, 1942 3 Sheets-Sheet 3

INVENTOR,
SIDNEY H. WEBSTER.

Sept. 25, 1945.  W. P. WILLS  2,385,481
MEASURING AND CONTROLLING APPARATUS
Filed March 25, 1943  2 Sheets-Sheet 2

*INVENTOR.*
WALTER P. WILLS
BY
*C. B. Spangenberg*
ATTORNEY.

Patented Sept. 25, 1945

2,385,481

UNITED STATES PATENT OFFICE 2,385,481

MEASURING AND CONTROLLING APPARATUS

Walter P. Wills, Philadelphia, Pa., assignor to The Brown Instrument Company, Philadelphia, Pa., a corporation of Pennsylvania Application March 25, 1943, Serial No. 480,579

19 Claims. (Cl. 172—239)

The present invention relates to the art of electrical measuring, and particularly to apparatus of the self balancing type for measuring and utilizing for control and analogous purposes minute direct current potentials such, for example, as those derived from thermocouples in measuring temperatures, or from photovoltaic or hydrogen ion cells in measuring other quantities or qualities.

A general object of the invention is to provide improved means for recalibrating or standardizing such apparatus.

It is customary in measuring and controlling instruments of the potentiometric type to provide a battery or dry cell for energizing the measuring circuit to produce the potential of known magnitude to which the potential under measurement is compared. However, while a battery is a satisfactory source of substantially constant potential for many purposes, batteries have well-known disadvantages which render them unfit for use for many other purposes. In particular, the voltage output of batteries gradually decreases with age and use, and in addition, fluctuates with variations in the ambient temperature to which they are subjected. Changes of this kind in the voltage output of the battery introduce inaccuracies into the measurements of the unknown potential which are obtained. The introduction of such inaccuracies is especially pronounced and is intolerable in potentiometric instruments of the so-called narrow span type. By a narrow span potentiometric instrument is meant one which is so designed that the range of measurement is narrow and highly suppressed, for example, from 900° F. to 1000° F. as compared with a range of 0° F. to 1000° F. or greater of potentiometric instruments of customary span. The narrow span or range of measurement is obtained by proportioning the various potentiometer resistances and by providing suppression resistances so as to spread out over the entire scale or range of measurement of the potentiometer slidewire the voltage change produced by a thermocouple when the temperature of the latter is varied over a narrow range of temperature. Thus, in a narrow span instrument the potential drop across the slidewire may be only a small fraction of that in ordinary span instruments, and consequently, variations in the voltage of the battery which in ordinary span instruments are not objectionable become very objectionable in narrow span instruments, the error introduced being magnified in proportion to the extent to which the span is narrowed. Thus, an error of only one-tenth of one percent is magnified to an error of one percent when the span is reduced by a factor of ten. In addition, the changes in battery current affect the degree of cold junction compensation obtained in the potentiometer. The battery current changes are effective also to introduce a change in the width of the span or range of measurement as well as to vary the absolute values of the upper and lower limits of the span. All of these errors are objectionable, and in certain applications such as in the measurement and control of critical temperatures in oil refinery systems, are intolerable, an error of a degree or two or even a fraction of a degree in the measurement obtained being sufficient to upset the refinery system operation.

Accordingly, it is an object of this invention to provide highly sensitive and continuously operative means for recalibrating or standardizing a potentiometer instrument to thereby accurately compensate for the battery voltage changes substantially as soon as they occur, thus avoiding the above mentioned objections.

It is also an object of the invention to provide means to protect the standard cell utilized from excessive drain and consequent damage when the potentiometer instrument is not in use or upon the occurrence of an abnormal condition of operation.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Fig. 1 is a wiring diagram of a self balancing potentiometric measuring and controlling system embodying the present invention;

Fig. 2 is a schematic illustration of the potentiometric unbalance detection and rebalancing apparatus of the arrangement of Fig. 1;

In Fig. 1 of the drawings there is illustrated, more or less diagrammatically, a self balancing potentiometric instrument for measuring, indicating, recording and controlling the value of a condition, for example, the temperature within the interior of a chamber 1. The chamber 1 is heated by burner means (not shown) to which fuel is supplied through a pipe 2. A pneumatic valve 3 is inserted in the pipe 2 for controlling the flow of fuel to the burner. The chamber 1 shown diagrammatically in Fig. 1 may in actual practice comprise any kind of chamber, the temperature in the interior of which it is desired to ascertain and to control within very close limits, and by way of example, may comprise a furnace or the debutanizer re-boiler unit in an oil refinery plant. Such a unit consists of a steam heated boiler, the temperature of which must be maintained at a critical value if the refining action is to be properly carried out.

A thermocouple 4 responsive to the temperature within the chamber 1 operates in conjunction with a potentiometric network generally designated by the reference numeral 5 and a slidewire assembly generally designated at 6 to form a self balancing potentiometer system. Upon a change in temperature within the chamber 1 an unbalanced D. C. potential in one direction or the opposite direction is produced depending upon the sense of unbalance of the potentiometer system. The unbalanced D. C. potential so derived is impressed on the input circuit of an electronic device 7 illustrated diagrammatically in Fig. 1 but in more detail in Fig. 2. The electronic device 7 includes a vibrator or equivalent device generally designated by the reference numeral 8, as seen in Fig. 2, a transformer designated by the character 9, amplifying vacuum tubes generally designated at 10 and 11, and motor drive vacuum tubes generally designated at 12 and 13.

The D. C. potential applied to the input circuit of the electronic device 7 is translated by the vibrator 8 into a pulsating current having one polarity or the opposite polarity depending upon the sense of unbalance of the potentiometric network. This pulsating current is converted into an alternating current and is detected and amplified by the transformer 9 and is further amplified by the vacuum tubes 10 and 11. The output from the vacuum tubes 10 and 11 is impressed on the input circuits of the motor drive vacuum tubes 12 and 13 and operates to control the conductivity of the latter as required to effect operation of a reversible electrical motor generally designated at 14 for rotation in one direction or the other. The shaft of motor 14 is connected by any suitable means indicated in Fig. 1 by the dotted line 15 to a drive mechanism generally designated at 16. The drive mechanism 16 operates the slidewire assembly 6 to rebalance the potentiometric network 5 and also operates indicating and recording means for indicating and recording the temperature conditions existing within the chamber 1. The drive mechanism 16 also is arranged to operate a controller generally designated at 17 which may comprise a pneumatic controller such as is illustrated in the C. B. Moore Patent 2,125,081 which was granted on July 26, 1938. The controller 17 is operatively connected to the pneumatic valve 3 and adjusts the latter as is required to maintain the temperature within the chamber 1 at the desired value.

The potentiometric network 5 includes four resistances 18, 19, 20 and 21 connected in series in one branch. The resistances 18, 19 and 20 are preferably formed of manganin wire having substantially zero temperature coefficient of resistance and are utilized for calibration purposes. The resistance 21 is preferably made of nickel, copper or other material having an appreciable positive temperature coefficient of resistance and is utilized for the purpose of effecting compensation for changes in the ambient temperature at the cold junctions of the thermocouple 4.

Figures 3, 4:
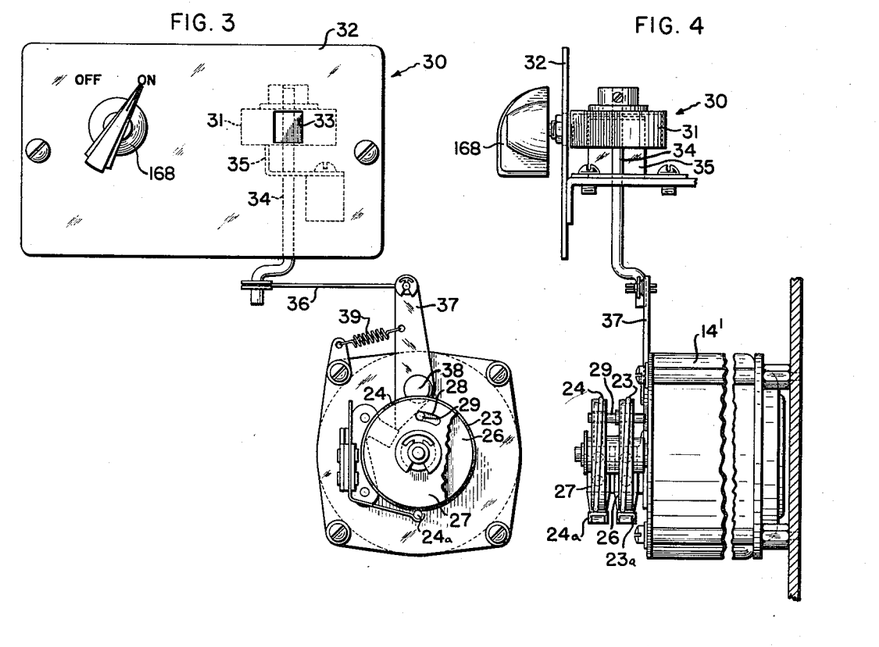
Figs. 3 and 4 illustrate in detail a preferred construction of the standardizing or recalibrating rheostat of Fig. 1 and its motive means.

Connected in parallel with the resistances 18, 19, 20 and 21 is a battery 22 which may be in the form of a dry cell and a dual vernier rheostat, a preferred construction of which is illustrated in Figs. 3 and 4, comprising slidewire resistances 23 and 24 and electrically connected sliding contacts 23a and 24a which are associated with the resistances 23 and 24, respectively. The dual vernier rheostat is adjusted by a reversible electrical motor 14' which may be identical to the motor 14 of Fig. 2 and comprises a part of an electronic device 25. The electronic device 25 may be identical to the electronic device 7 illustrated in detail in Fig. 2. The slidewire 23 is wound on the circumference of a disc 26 and the slidewire 24 is wound on the circumference of a disc 27. Both of the discs 26 and 27 are connected to the shaft of motor 14'. The shaft of motor 14', as seen in Figs. 3 and 4, is rigidly connected to the disc 26 and operates to rotate the latter and thereby cause relative motion between the slidewire 23 and the contact 23a. Consequently, upon rotation of the motor 14' the slidewire 23 and contact 23a are relatively adjusted in one direction or the other depending upon the direction of rotation of the motor. A lost motion connection is provided between the shaft of motor 14' and the disc 27. This lost motion connection is so designed that for a predetermined angular motion of the shaft of motor 14', no motion is imparted to the disc 27. Accordingly, no relative motion between the slidewire resistance 24 and contact 24a is then produced. Upon further rotation of the motor shaft, however, the lost motion will all be taken up whereupon the contact 24a will be adjusted along the resistance 24 in the same direction in which the contact 23a is moved along the resistance 23. To this end the disc 27 is loosely mounted on the shaft of motor 14' and is provided with an opening 28 through which a pin 29 carried by disc 26 extends. The opening 28 is formed as shown in Fig. 3 to permit the disc 26 and pin 29 to move through a predetermined angle before the pin 29 engages the side of opening 28 and rotates the disc 27. Upon further motion of disc 26 and pin 29, the disc 27 is caused by the pin 29 to move in unison with the disc 26.

As illustrated in Figs. 3 and 4, the preferred embodiment of my invention is also provided with a tell-tale designated generally by the numeral 30 to indicate when the dual vernier rheostat is approaching the end of its travel, and thereby to provide an indication when the voltage of the potentiometer battery 22 has decreased to such an extent that it should be replaced with a new battery. The tell-tale 30 is designed to operate only when the dual vernier rheostat is approaching the end of its travel. Until that time it remains at rest. The tell-tale is provided with a rotatable drum 31 which is positioned immediately behind an opening 33 in an opaque plate 32 which may be composed of metal or other suitable material. One section of the circumferential surface of drum 31 is painted white and the remainder is painted red. When the tell-tale 30 is in its normal position of rest only the white portion of the surface of the drum 31 can be seen through the opening or peep hole 33 in the plate 32. When the dual vernier rheostat has completed approximately eighty percent of its travel, however, the drum 31 is rotated in a manner to be described to cause the red portion of the surface of the drum 31 to be seen through the opening 33. To this end the drum 31 is mounted on a shaft 34 which, in turn, is supported for rotation by a fixed U-shaped bracket 35. Openings only slightly larger than the diameter of shaft 34 in each of the arms of bracket 35 serve as supporting bearings for the shaft 34.

The shaft 34 is bent at its lower end to provide a crank arm which is connected by a link 36 to the upper end of a lever 37 which is pivoted at point 38 on the motor 14'. Lever 37 extends down beyond the pivot point 38 between the disc 26 and the motor 14' and is adapted to be engaged by the pin 29 carried by disc 26 when the disc 26 has been rotated through approximately eighty percent of its travel. Further rotation of disc 26 and pin 29 causes the lever 37 to be moved clockwise about its pivot point 38 against the opposing action of a spring 39 which is anchored at one end to the motor 14' and is connected at its other end to the lever 37. Such motion of lever 37 operates through link 37 and the crank arm provided on the lower end of shaft 34 to rotate the latter and thereby cause the red section of drum 31 to be seen through peep hole 33.

The slidewire resistance 23 wound on disc 26 is preferably made of nickel and is of low resistance compared to the resistance of slidewire resistance 24. The resistance 24 wound on disc 27 is preferably made of Ohmax wire. Thus, the resistance 23 comprises a fine adjustment of the current flow from battery 21 while the resistance 24 comprises a coarse adjustment. Preferably, the resistance of the total length of resistance 23 is the same as that of one convolution of the resistance 24.

Also connected in parallel with the resistances 18, 19, 20 and 21 are two resistances 40 and 41 which are connected in series and comprise another branch of the potentiometric circuit. The resistance 40 is preferably made of nickel, copper or other material having a positive temperature coefficient of resistance, and the resistance 41 may be formed of manganin wire having a substantially zero temperature coefficient of resistance. The resistance 40 in conjunction with the resistance 21 operates to compensate for changes in the ambient temperature to which the cold or reference junction of the thermocouple 4 is subjected. The ratio of resistance 21 to the total resistance of the branch including it is the same as the ratio of resistance 40 to the total resistance of its branch. Thus, with the potentiometric network so designed that the current flow through the branch including resistances 18, 19, 20 and 21 is twice as much as that through the branch including resistances 40 and 41, the resistance 21 may advantageously have a value one-half that of resistance 40.

Figure 5:
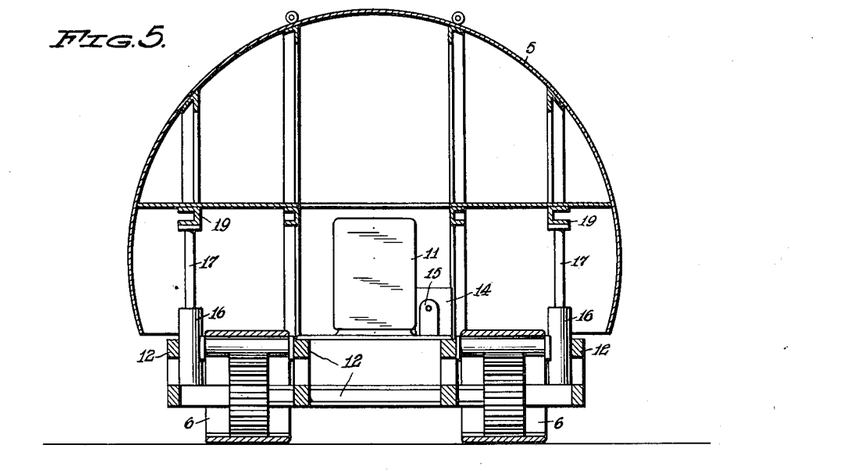
Figs. 5 and 6 illustrate in detail the thermocouple cold junction and the compensating resistance in physical engagement therewith.
Figure 6:
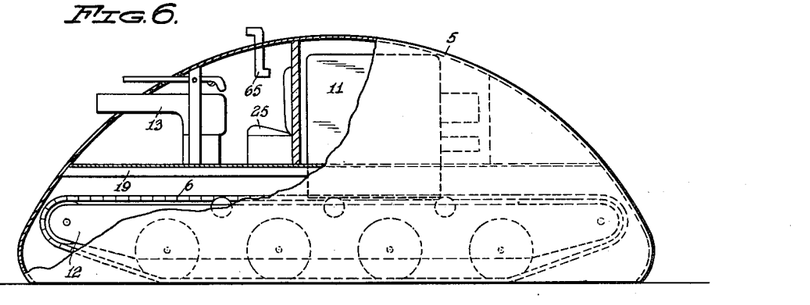
Figure 7:
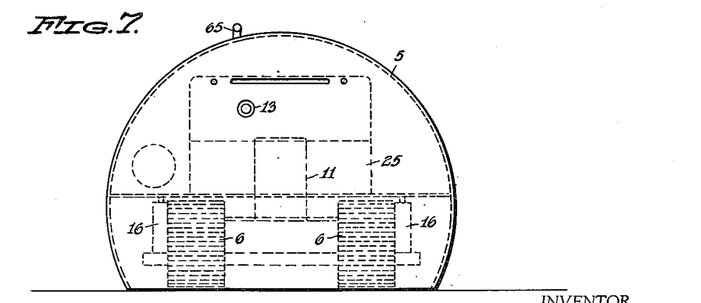

The cold junction 42 of the thermocouple 4 is disposed closely adjacent the resistance 40, desirably in physical contact therewith, so that these elements partake of the same temperature. A preferred construction for accomplishing this result is shown in Figs. 5 and 6 described in detail hereafter. Preferably, the resistances 21 and 40 are also disposed closely adjacent each other as shown so as to be at the same temperature.

In a potentiometric instrument of the so-called narrow span type, the thermocouple 4 may desirably be an iron-constantan thermocouple. In such case, the cold junction 42 of the thermocouple 4 comprises the point of engagement of the ends of a constantan wire 43 and an iron wire 44. The other end of the constantan wire is joined to the end of an iron wire 48 and this junction forms the hot junction of the thermocouple 4. The other end of the iron wire of 44 is connected to a terminal 45 on a terminal block 46 which is also provided with a second terminal 47. The terminals 45 and 47 are placed close together so as to be at substantially the same temperature. The other end of the thermocouple iron wire 48 is connected to the terminal 47. The constantan wire 43 and the iron wires 44 and 48 comprise the wires of dissimilar material of which the thermocouple 4 is constructed. The terminal 45 is connected by a copper wire 49 to the point 50 on the potentiometric network 5. The point 50 comprises the point of engagement of the resistances 40 and 41. The terminal 47 is connected by a copper wire 51 to one input terminal of the electronic device 7. The other input terminal of the electronic device 7 is connected by a copper wire 52 to the rebalancing contact of the potentiometric network 5.

With this arrangement, so long as the terminals 45 and 47 are at substantially the same temperature the inclusion of the potentiometric network 5 in circuit with the thermocouple 4 will not affect the thermal electromotive force developed by the thermocouple 4 upon variations in the temperature of the cold junction 42 of the thermocouple. Furthermore, slight differences in temperature between the terminals 45 and 47 will have little or no effect upon the thermal electromotive force developed by the thermocouple 4. It will be noted that the terminal 45 comprises the junction of the iron wire 44 and the copper wire 49. Similarly, the terminal 47 comprises the junction of the iron wire 48 and the copper wire 51. Thus, the wires 44 and 49 may be considered to comprise one thermocouple while the wires 48 and 51 may be considered to comprise another thermocouple. The electromotive forces developed by these two thermocouples are in opposition to each other, however, and moreover iron-copper thermocouples are very inefficient in producing a thermal electromotive force. Consequently, any slight differences in temperature which may exist at the terminals 45 and 47 will have little or no effect on the thermal electromotive force produced by the thermocouple 4. In addition, with the terminals 45 and 47 placed close to each other, the temperatures at these terminals will always be approximately the same whereupon no resultant electromotive force will be introduced into the thermocouple circuit because of the inclusion of these terminals and the potentiometric network 5 in the thermocouple circuit.

The connection of the thermocouple 4 to the potentiometric network 5 disclosed in the drawings and just described is particularly advantageous in that it is only necessary to have two conductors, namely conductors 43 and 44 leading to the compensating resistance 40. This is to be distinguished from the prior art wherein it has been the practice to have the ends of both thermocouple wires terminate in close proximity to the compensating resistance, thus necessitating the use of four conductors to the compensating resistance, two leading to the resistance and two leading away. Moreover, since the cold junction 42 of the thermocouple 4 and the resistance 40 are in physical contact with each other, it is not necessary to lag the resistance 40 so as to prevent the latter from following closely the changes in ambient temperature to which it is subjected. It has been customary in the prior art to provide means for the purpose of creating such a lagging effect so as to always maintain the temperature of the thermocouple cold junctions and that of the compensating resistance substantially the same. With the arrangement disclosed in the drawings extremely accurate and quick compensation for variations in the cold junction temperature of the thermocouple 4 is obtained without requiring the use of such lagging, the cold junction 42 and resistance 40 always being at substantially the same temperature because of being in physical contact with each other. This result is obtained together with the advantageous feature that the conductors 49 and 51 leading from the terminal block 46 to the potentiometric network 5 may be copper.

A preferred construction of the temperature compensating resistance 40 and the cold junction 42 of the thermocouple 4 is illustrated, more or less diagrammatically, in Figs. 5 and 6. As shown in Figs. 5 and 6, the resistance element 40 consists of a core member 53 which may be made from a piece of woven glass fibre tubing. The compensating resistance 40 is wound on the core member 53. The wires 43 and 44 of the thermocouple 4 are placed in physical contact with the surface of the winding 40 with the cold junction 42 at an intermediate section. The winding 40 and the cold junction 42 and the wires 43 and 44 are covered with a larger piece of woven glass tubing 54 and the ends are bound with thread as at 55 to prevent their fraying. The whole assembly is impregnated with a suitable varnish, lacquer or like substance to stiffen and provide protection for the resistance element. The thermocouple wires 43 and 44 extend through the cover 54, as shown. The resistance 40 is preferably covered with Formex insulation which serves to insulate the turns of the resistance winding and also serves to insulate the winding from the thermocouple cold junction 42 and the wires 43 and 44. Leads 56 and 57 comprising relatively stiff wire pierce the sleeve 54 and core 53 near one end of the resistance element, cross to the side of the core opposite the point at which they enter and then are securely clamped to the core 53 by piercing the core 53 in two places and bending the ends over, as shown. The ends of the resistance 40 are secured to these leads as by soldering extended portions 58 to them. This construction of the device provides strong substantial connections to the resistance 40, particularly when the device has been impregnated and dried.

This manner of constructing a resistance device is disclosed and being claimed in the copending application Serial No. 391,319 of Frederick P. A. Wagner filed May 1, 1941, issued into Patent 2,357,241 on August 29, 1944, and therefore, further description thereof is believed unnecessary. Preferably all of the resistance elements 18, 19, 20, 21 and 41 are similarly constructed. The resistance element disclosed in Figs. 5 and 6, however, differs from that shown in the said Wagner patent in the provision of the thermocouple cold junction 42 in close physical contact with winding 40.

The resistance 41 which is connected in the circuit branch of the potentiometric network 5 including the resistance 40 is utilized primarily for standardizing or recalibrating purposes and is so proportioned that the voltage drop produced across it by the flow of current from the battery 22 is equal to the voltage produced by a standard cell which has been designated by the reference character 59.

Slidwire assembly 6 includes a cable drum 60 which is rotated by the drive mechanism 16 by means of a cable 61. The cable 61 may comprise a wire or a violin string. The cable drum 60 is provided with an adjustment for varying the diameter or circumference thereof. Such adjustment may be of the form disclosed in the copending application of John A. Caldwell, Serial No. 421,175 filed December 1, 1941. The cable drum 60 operates through an adjustable connection to move a contactor 62 in engagement with a slidewire in the form of a resistance wire 63 which is space wound around an insulated core 64. Preferably, the slidewire 63 and the core 64 are formed of the same material, such as manganin wire having substantially zero temperature coefficient of resistance. The contactor 62 also engages a collector bar in the form of a resistance wire 65 which is space wound around a core 66 and is completely electrically conductive with respect thereto throughout its length. Preferably, the resistance wire 65 and core 66 are formed of the same material, such as manganin wire, as the resistance wire 63 and core 64. A resistance 67 is connected in shunt to the slidewire resistance 63 and core 64 and also in shunt to the resistance 19. Preferably, the slidewire assembly 6 is provided with a terminal block (not shown) but which may be generally like that disclosed in the aforementioned Caldwell application.

Referring to Fig. 2 it will be noted that one input terminal of the electronic device 7 comprises the junction of a pair of primary windings 68 and 69 provided on the transformer 9. This input terminal is that to which the collector bar 65 is connected by conductor 52. The primary windings 68 and 69 are wound around a core structure 70. The transformer 9 is also provided with a secondary winding 71 which also is wound around the core structure 70. A shield 72 is provided between the primary windings 68 and 69 and the secondary winding 71. The windings and core structure of the transformer are housed in a casing, not shown. The core structure 70, the shield 72 and the casing are all connected to a grounded conductor 74.

The vibrator 8 may be of the type disclosed in the copending application of Frederic W. Side, Serial No. 421,176 filed December 1, 1941, and comprises a vibrating reed 75 for operating a contact 76 with respect to relatively stationary contacts 77 and 78. The contact 76 is connected through the vibrating reed 75 to the conductor 51 and constitutes the second input terminal of the electronic device 7. The vibrating reed 75 is vibrated under the influence of a winding 79 which is supplied with alternating current from the secondary winding 80 of a transformer 81 having a line voltage primary winding 82 and additional secondary windings 83 and 84. A permanent magnet 85 associated with the vibrating reed 75 is utilized for polarizing and synchronizing purposes. The mounting structure for the vibrating reed, contacts, operating winding and permanent magnet are all connected to the grounded conductor 74. A housing, not shown which also is connected to the grounded conductor 74 encloses the mechanism of the vibrator 8.

With the arrangement disclosed in the drawings and thus far described, the flow and the direction of flow of current through the circuit branch from the point 50 on the potentiometric measuring circuit 5 to the thermocouple 4, the conductor 51, the vibrating reed 75 of the vibrator 8, the primary windings 68 and 69 of the transformer 9, the conductor 52, and the collector bar 65 to the contactor 62 depends upon the relation between the electromotive force produced by the thermocouple 4 and the potential difference between the potentiometric circuit point 50 and the point of engagement of the contactor 62 with the slidewire resistance 63. For convenience, the point of engagement of the contactor 62 and the slidewire resistance 63 has been designated by the reference numeral 87. The thermocouple 4 is so connected to the potentiometric circuit that the electromotive force of the thermocouple opposes the potential difference between the potentiometric points 50 and 87. The potential difference between the points 50 and 87 is increased and decreased by movement of the contactor 62 in a clockwise and a counter-clockwise direction, respectively. With suitable adjustments of the contactor 62 the potential difference between the points 50 and 87 will be equal and opposite to the electromotive force produced by the thermocouple 4 and no current will flow through the above mentioned circuit branch including the vibrator 8 and the transformer 9. On an increase in the thermocouple electromotive force above the potential difference between the points 50 and 87 current will flow in one direction through the vibrator 8 and the primary windings 68 and 69 of the transformer 9 and such current flow may then be eliminated by a suitable adjustment of the contactor 62 in a clockwise direction. Conversely, when the electromotive force of the thermocouple 4 falls below the potential difference between the potentiometric circuit points 50 and 87, the resultant current flow through the vibrator 8 and the transformer 9 will be in such a direction as to be eliminated by a suitable adjustment of the contactor 62 in a counter-clockwise direction.

The contactor 62 is adjusted along the slidewire resistance 63 and the collector bar 65 by the operation of the reversible electrical motor 14 which, as noted above, operates the drive mechanism 16 which, in turn rotates the cable drum 60, with which the contactor 62 is rigid, by means of the cable 61. The reversible electrical motor 14 has a pair of terminals 88 and 89 which are connected in the output circuits of the vacuum tubes 12 and 13 and also has a pair of terminals 90 and 91 which are connected by means of conductors 92 and 93, respectively, to the alternating current supply lines $L^1$ and $L^2$. A condenser 94 of suitable value is connected in the conductor 93.

For its intended use, the motor 14 may be of the form shown in the drawings and comprises a rotor 95 and two pairs of oppositely disposed field poles (not shown) on one pair of which a winding 96 is wound and on the other pair of which a winding 97 is wound. Winding 96 has its terminals connected to the motor terminals 90 and 91 and is supplied with energizing current from the alternating current supply lines $L^1$ and $L^2$ through the condenser 94. Due to the action of the condenser 94 the current which flows through the motor winding 96 will lead the voltage of the alternating supply lines by approximately 90°. The winding 97 has its terminals connected to the motor terminals 88 and 89 and is supplied with energizing current from the output circuits of the vacuum tubes 12 and 13. The current supplied to the winding 97 from the vacuum tubes 12 and 13 is in phase or is displaced 180° with respect to the voltage of the alternating current supply lines and establishes a field in the rotor 95 which is displaced 90° in one direction or the other with respect to that established therein by the winding 96. The reaction between the field set up by the winding 96 with that set up by the winding 97 establishes a rotating field in the rotor which rotates in one direction or the other depending upon whether the winding 97 is energized with current in phase with the voltage supplied by the supply lines $L^1$ and $L^2$ or displaced 180° in phase therewith, and thereby, as is explained in detail hereinafter, in accordance with the direction of unbalance of the potentiometric measuring circuit 5. The direction and duration of rotation of the motor 14 is controlled in accordance with the direction and extent of unbalance of the potentiometric measuring circuit 5 so that on rotation of the motor 14 the contactor 62 is adjusted in the proper direction to rebalance the potentiometric measuring circuit 5.

The motor rotor 95 operates a pinion 98 provided in the drive mechanism 16 and the pinion 98, in turn, drives a gear 99. The gear 99 carries a gear 100 and a cable drum 101. The cable 61 which drives the contactor 62 of the slidewide assembly 6 is fastened to the cable drum 101 and passes over a tension pulley 102 carried by a lever 103 which is pivoted at 104 at one end and is urged downwardly by a spring 105. The cable 61 also passes over pulleys 106 and 107 and is fastened to the cable drum 60. The spring 105 urging the pulley 102 downwardly maintains a predetermined tension in the cable 61 so that the relative angular positions of the cable drum 101 and the cable drum 60 will always remain fixed. The lever 103 is provided with an enlarged hole 108 through which a stationary pin 109 extends, the pin cooperating with the hole to act as a stop for limiting the movement of the lever 103. The gear 100 operates a gear sector 110 which, in turn, operates a pen arm 111 for recording the value and the changes in value of the temperature within the chamber 1 on a chart 112 and also operates an arm 113 for controlling the control device 17. The chart 112 is rotated at a constant speed by a chart drive motor 114. The chart drive motor 114 is a unidirectional electric motor and is supplied with alternating current from alternating current supply lines $L^1$ and $L^2$.

The arm 113 operates a flapper mechanism 115 which is carried by the body portion 116 of the control device 17. The control device 17 is equipped with dials 117 and 118 for adjusting the throttling range and the rate of reset of the control device. Air under pressure is supplied through a pipe 119 to a pneumatic relay mechanism 120 and a pipe 121 controlled by the control device 17 regulates a pilot valve contained in the relay mechanism 120 to produce a pressure in a pipe 122 in accordance with the temperature condition existing within the chamber 1. The pressure in the pipe 122 is transmitted through a pipe 123 to a pneumatic motor 124 which operates the valve 3 and the pressure is also transmitted through a pipe 125 to the control device 17 in order to provide follow-up and reset action in the control device 17.

Upon an increase in temperature within the chamber 1 the reversible motor 14 is operated in the counter-clockwise direction to drive the gear 99 in a clockwise direction. Rotation of the gear 99 in a clockwise direction causes the contactor 62 of the slidewire assembly 6 to rotate in a clockwise direction to rebalance the potentiometric network 5. Clockwise rotation of the gear 99 also causes the gear sector 110 and the pen 111 to rotate in a counter-clockwise direction to record on the chart 112 the increase in temperature which has taken place within the chamber 1. Counter-clockwise rotation of the gear sector 110 operates through the arm 111 and the flapper assembly 115 to actuate the control device 17 and to thereby position the relay mechanism 120 as required to effect a decrease in the pressure transmitted to the pneumatic motor 124 of the valve 3. This effects an adjustment of the valve 3 toward its closed position to decrease the supply of heating agent to the chamber 1 for the purpose of reducing the temperature of the chamber 1 to the desired value. The decrease in pressure transmitted to the diaphragm motor 124 is also transmitted to the control device 17 to provide a follow-up action for causing the valve 3 to be positioned in accordance with the temperature within the chamber 1. This decrease in pressure transmitted to the control device 17 also operates through the reset mechanism contained within the device 17 to additionally position the valve 3 towards its closed position if the deviation of the temperature in the chamber 1 from the desired value persists over a substantial period of time.

Upon a decrease in temperature within the chamber 1 the opposite action takes place, the contactor 62 of the slidewire assembly 6 being moved in a counter-clockwise direction, the pen arm 111 being moved in a clockwise direction to record on the chart 112 the decrease in temperature and the control device 17 being actuated to cause proportionate opening of the valve 3 to increase the supply of heating agent to the chamber 1 for restoring the chamber temperature to the desired value.

The gear 99 is provided with an abutment 126 which engages the drive pinion 98 when the gear 99 is rotated to either extreme position. In engaging the drive pinion 98 the abutment 126 stalls the reversible electrical motor 14 and prevents over-travel of the contactor 62 of the slidewire assembly 6 and over-travel of the pen arm 111.

The details of the amplifying and motor drive section of the electronic device 7 will now be described. As noted hereinbefore, the electronic device 25 may be identical in every way to the electronic device 7, and therefore, the description of the electronic device given in connection with Fig. 2 also is a description of the electronic device 25.

The amplifying tube 10 of the electronic device 7 includes two heater type triodes which have been designated by the reference numerals 127 and 128 within the same envelope. The triodes 127 and 128 each include an anode, control electrode, a cathode and a heater filament. The heater filaments are connected in parallel and are supplied with energizing current from the transformer secondary winding 80. The conductors connecting the transformer secondary winding 80 to the heater filaments of triodes 127 and 128 have not been shown in order not to complicate the drawings. The transformer secondary winding 80 is also connected by conductors not shown to the heater filaments contained within the amplifying tube 11 and contained within the motor drive tubes 12 and 13.

The electronic tube 11 also includes two heater type triodes designated by reference numerals 129 and 130 within the same envelope. Each of the triodes 129 and 130 include anode, control electrode, cathode and heater filament elements. The heater filament elements are connected in parallel. The triode 130 is utilized as a half wave rectifier to provide a source of direct current voltage for energizing the anode or output circuits of the triodes 127, 128, and 129. As shown, the control electrode and cathode of the triode 130 are connected directly to each other and the output circuit thereof is energized by the transformer secondary winding 83 through a circuit which may be traced from the left end terminal of the winding 83 through a conductor 131 to the anode of triode 130, the cathode of triode 130 and through a conductor 132 to the positive terminal of a filter generally designated by the reference numeral 133. The negative terminal of the filter 133 is connected by a conductor 134 to the right end terminal of the transformer secondary winding 83.

The filter 133 includes a condenser 135 which operates to smooth out the ripple in the output voltage of the filter between the points 136 and 137. The filter 133 also includes a resistance 138 and a condenser 139 which operate to smooth out the output voltage between the filter points 140 and 137. In addition, the filter 133 includes a further resistance 141 and a condenser 142 for smoothing out the output voltage of the filter between the points 143 and 137. The filter, therefore, comprises three stages. Such a three-stage filter is provided because for the most satisfactory and efficient operation it is desirable that the anode voltage supplied to the triode 127 be substantially free from ripple whereas it is not necessary to supply anode voltage so completely free from ripple to the output circuit of the triode 128. Likewise, it is not necessary to supply anode voltage as free from ripple to the triode 129 as it is to the triode 128.

The anode circuit of the triode 127 may be traced from the filter point 143 which comprises the positive terminal of the direct current voltage supply through a fixed resistance 144 to the anode of triode 127, the cathode thereof, and through a cathode biasing resistance 145 shunted by a condenser 146 to the negative filter point 137 through the grounded conductor 74. The cathode biasing resistance 145 and the parallel connected condenser 146 are provided for biasing the control electrode of triode 127 negatively with respect to the cathode.

The input circuit of the triode 127 may be traced from the cathode through the parallel connected resistance 145 and condenser 146 through the transformer secondary winding 71 and a conductor 147 to the control electrode of triode 127.

The output circuit of triode 127 is resistance capacity coupled to the input circuit of triode 128 by means of a condenser 148 and a fixed resistance 149. In particular, the anode of the triode 127 is connected by condenser 148 to the control electrode of the triode 128 and said control electrode is connected through the resistance 149 to the grounded conductor 74 and thereby to the cathode of the triode 128.

The anode circuit of the triode 128 may be traced from the positive terminal 140 of the filter 133 through a fixed resistance 150 to the anode of triode 128, the cathode thereof, and the grounded conductor 74 to the negative terminal 137 of the filter.

The output circuit of the triode 128 is resistance capacity coupled to the input circuit of the triode 129 by means of a condenser 151 which is connected between the anode of the triode 128 and the control electrode of the triode 129 and by means of a resistance 152 which is connected between the control electrode of the triode 129 and the cathode thereof. A contact 153 in adjustable engagement with the resistance 152 is provided for varying the point of connection of the control electrode the triode 129 to the resistance 152. The resistance 152 and contact 153 perform a dual function, namely, to limit the extent to which the control electrode of the triode 129 may be driven positive with respect to its associated cathode and also to vary the proportion of the signal impressed on the control electrode of triode 129 from the output circuit of the triode 128. It is noted the resistance 149 connected in the input circuit of triode 128 also operates to limit the extent to which the control electrode of triode 128 may go positive with respect to its associated cathode and in addition operates to maintain the control electrode of the triode 128 at the same potential as its associated cathode when no voltage is induced in the transformer secondary winding 71.

The electronic tubes 12 and 13 each include two heater type triodes within the same envelope. The triodes within the tube 12 have been designated by the reference numerals 154 and 155 while the triodes within the tube 13 have been designated by the reference numerals 156 and 157.

Anode voltage is supplied to the output circuits of the triodes 154 and 156 in parallel from the transformer secondary winding 84. To this end, the anodes of the triodes 154 and 156 are both connected by a conductor 158 to the left end terminal of the transformer secondary winding 84, and the anodes of the triodes 155 and 157 are connected together and by a conductor 159 to the right end terminal of the secondary winding 84. The cathodes of the triodes 154, 155, 156 and 157 are all connected together and through a fixed biasing resistance 160 to the grounded conductor 74 and thereby to the terminal 89 of the motor 14. The other terminal 88 of motor 14 is connected by a conductor 161 to a center tap on the transformer secondary winding 84. Thus, the triodes 154, 155, 156 and 157 are utilized for supplying energizing current to the motor winding 97. The anode circuits of the triodes 154 and 156 are connected in parallel and are arranged to become conductive when the left end terminal of the transformer secondary winding 84 is positive with respect to the potential of the center tap. Similarly, the anode circuits of the triodes 155 and 157 are also connected in parallel and are arranged to become conductive when the right end terminal of the transformer secondary winding is positive relatively to the potential of the center tap.

The electrical circuit shown in Fig. 2 and described herein for selectively controlling the operation of the reversible motor 14 for rotation in one direction or the other comprises no part of the present invention but is disclosed and is being claimed in application Serial No. 421,173 filed by W. P. Wills for Measuring apparatus, on December 1, 1941. For the present purposes, therefore, it is believed sufficient to note that the motor 14 is preferably so constructed that the impedance of the winding 97 is of the proper value to match the impedance of the anode circuits of the triodes 154, 155, 156 and 157 when the motor is operating in order to obtain the most efficient operation. Preferably, the motor is so constructed that it has a high ratio of inductance to resistance, for example, of the order of 6 to 1 or from 8 to 1 at the frequency at the energizing current supplied to it. This provides for maximum power during the running condition of the motor with the least amount of heating and also provides a low impedance path for braking purposes.

The condenser 94 connected in the energizing circuit to the motor winding 96 is so selected with respect to the inductance of the latter as to provide a series resonant circuit having a unity power factor. By virtue of the series resonant circuit the total impedance of the motor winding 96 is substantially equal to the resistance of the winding and since this resistance is relatively low a large current flow through the winding is made possible. This permits the attainment of maximum power and torque from the motor 14. In addition, the current flow through the motor winding 96 is in phase with the voltage of the alternating current supply conductors $L^1$ and $L^2$ because of the series resonant circuit. The voltage across the motor winding 96, however, leads the current by substantially 90° because of the inductance of the winding 96.

Energizing current is supplied to the motor winding 97 from the transformer secondary winding 84 through the anode circuits of the triodes 154, 155, 156 and 157 through the circuits previously traced. A condenser 162 is connected in parallel with the motor winding 97 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 154 and 156 connected in parallel, and the anode circuits of the triodes 155 and 157 connected in parallel, and therefore, provides efficient operation. The relatively low or internal circuit impedance approximates the actual resistance of the motor winding 97, and since this resistance is relatively low, the impedance of the local circuit is also relatively low.

The output circuit of the triode 129 is resistance capacity coupled to the input circuits of the triodes 154, 155, 156 and 157 by means of a condenser 163 and a resistance 164. Specifically, the anode of the triode 129 is connected through the condenser 163 to the control electrodes of all of the triodes 154, 155, 156 and 157 and the said control electrodes are all connected through the resistance 164 to the grounded conductor 74 and through the biasing resistance 160 to all of the cathodes of the triodes 154, 155, 156 and 157. The resistance 164 connected in the input circuits of all of the said triodes operates to maintain the control electrodes of the said triodes at the same potential as their associated cathodes when no voltage is induced in the transformer secondary winding 71, and upon the induction of the voltage in the winding 71 resistance 164 permits the flow of grid current to thereby limit the extent to which the control electrodes of the triodes may go positive with respect to their associated cathodes.

For the condition when the potentiometric network 5 is balanced, no voltage is induced in the transformer secondary winding 71, and therefore, the potentials of the control electrodes of all of the triodes remain substantially constant. Under this condition of operation, a pulse of unidirectional current flows through anode circuits of the triodes 154 and 156 to the motor winding 97 from the left hand section of the transformer secondary winding 84 during the first half cycle of the alternating voltage supply. During the second half cycle of the alternating voltage supply a pulse of current flows through the anode circuits of the triodes 155 and 157 in parallel to the motor winding 97 from the right hand section of the transformer secondary winding 84. Since the control electrodes of the triodes 154, 155, 156 and 157 are all connected together and since the potentials of these control electrodes remain substantially constant when the potentiometric network 5 is balanced, pulses of equal magnitude flow in the anode circuits of the said triodes during each succeeding half cycle of the alternating voltage supplied by the transformer secondary winding 84.

Consequently, when the potentiometric network 5 is balanced, pulsating unidirectional current of twice the frequency of the alternating supply current is impressed on the motor winding 97. When thus energized, the motor rotor 95 is not urged to rotation in either direction and remains stationary. Due to the relatively high D. C. component of the current then flowing through the motor winding 97, the core structure of the motor 14 tends to become saturated whereby the inductive reactance of the motor winding 97 is relatively small. The condenser 162 in shunt to the motor winding 97 is so chosen that the condenser and motor winding then form a parallel resonant circuit. This saturation of the core structure of the motor 14 operates to exert an appreciable damping effect on the rotor 95 of the motor, or in other words, an effect tending to prevent rotation of the rotor 95. Accordingly, if the rotor 95 has been rotating, saturation of the motor core structure operates to quickly stop the rotation.

Upon unbalance of the potentiometric measuring network 5 the magnitude of the pulses of current flowing in the anode circuit of one pair of triodes 154, 156 or 155, 157 will be increased while the magnitude of the pulses of current flowing in the anode circuits of the other pair of triodes will be decreased. As a result, the pulses of unidirectional current supplied to the motor winding 97 during the first half cycle will predominate over those supplied the motor winding 97 during the second half cycle. Such energization of the motor winding 97 operates to introduce therein an alternating component of current of the same frequency as that supplied by the alternating current supply lines $L^1$ and $L^2$. This alternating current component of current will be either in phase with or 180° out of phase with the alternating current flowing through the motor winding 96 depending upon the direction of potentiometric unbalance and produces an alternating magnetic field in the motor core structure which reacts with the alternating magnetic field established by the motor winding 96 to produce a rotating field in the motor. This rotating field rotates in one direction or the other depending upon the direction of potentiometric unbalance and effects actuation of the motor rotor 95 for rotation in a corresponding direction. When the motor winding 97 is so energized, the D. C. component of current is decreased, and therefore, the saturation of the motor core structure is decreased with the result that the rotor damping effect is also reduced.

In order to permit rapid operation of the reversible electrical motor 14 in effecting rebalancing of the potentiometric network 5 without overshooting and consequent hunting occurring, the response of the motor 14 must be correlated with the unbalance and rebalancing operation of the potentiometric network. This may be accomplished by adjusting the contact 153 along the resistance 152 which is employed for the purpose of coupling the output circuit of triode 128 to the input circuit of triode 129. By moving the contact 153 in an upward direction, the amplitude of signal on the control electrodes of the triodes 154, 155, 156 and 157 is increased for any given signal induced in the transformer secondary winding 71 and by moving the contact 153 in a downward direction the amplitude of signal is decreased. This, therefore, adjusts the sensitivity of the electronic device 7 whereby the response of the reversible electrical motor 14 may be correlated exactly with the operation of the potentiometric network. If desired, anti-hunting means as disclosed in Patent 2,300,742 issued November 3, 1942, to Harrison and Wills may also be utilized to obtain rapid rebalancing without over-shooting and hunting occurring.

According to the present invention, the potentiometric network 5 is continuously recalibrated by adjustment of the resistances 23 and 24 as is required to maintain the current flow through the slidewire resistance 63 substantially constant notwithstanding variations in the voltage of the battery 22 or other condition changes tending to cause a change in current flow through the slidewire resistance 63. To this end the potential drop produced across the resistance 41 in the potentiometric network 5 is opposed to the voltage of the standard cell 59 and the difference voltage is impressed on the input circuit of the electronic device 25. The electronic device 25, as previously noted, may be identical to the electronic device 7 and is also provided with a reversible electrical motor 14' shown in Figs. 3 and 4 and which corresponds to the motor 14 of device 7. This reversible electrical motor 14' is mechanically connected to the contacts 23a and 24a and operates to adjust the latter along the length of the resistances 23 and 24 whenever the potential drop across resistance 41 differs from the voltage of the standard cell 59. The operation of electronic device 25, which is highly sensitive and instantaneously detects any unbalance in the opposed potentials, is continuous, and therefore, the potentiometric network is always maintained at the exact and desired condition of calibration. The provision of two cold junction resistances 21 and 40, as described minimizes the tendency of the calibration of the potentiometric network 5 to change with changes in cold junction temperature due to resulting changes in current distribution of the network. This operation together with the continuous operation of the electronic device 25 and reversible motor 14' makes possible extreme constancy and accuracy of calibration and thereby highly accurate measurement of the temperature within the chamber 1 at all times.

In order to prevent excessive drain from the standard cell 59 and to thereby prolong the life of the latter, a relay 165 provided with a switch 166 may be utilized as shown in Fig. 1 for opening the circuit in which the potential drop across resistance 41 and the voltage of standard cell 59 are opposed when the apparatus is disconnected from the alternating current supply lines $L^1$ and $L^2$ and also upon failure of the alternating current supply while the apparatus is in operation.

To this end the operating coil 167 of the relay 165 is connected to the supply lines L¹ and L² together with the electronic devices 7 and 25 and the unidirectional motor 114. A manually operable switch 168 is preferably provided, as shown, for connecting and disconnecting the devices 7, 25, 114 and 165 to the supply lines L¹ and L². When the power supply is normal, the operating coil 167 of the relay 165 holds the switch 166 closed and thereby causes the latter to complete the circuit opposing the potential drop across resistance 41 and the standard cell 59. Upon disconnection of the apparatus from the supply line L¹ and L² or upon failure of the alternating power supply, however, the relay 165 is deenergized whereupon the switch 166 is opened. This causes the standard cell circuit to be opened, and thereby effectively prevents any drain from the latter which might otherwise be caused as a result of a change in the voltage of the battery 22 occurring during the time of such disconnection from, or failure of, the alternating current power supply. Such drain conceivably could be so excessive as to render the standard cell unfit for further use. Since the electronic device 25 operates continuously to maintain the potentiometric network 5 in its proper condition of calibration, the potential drop across the resistance 41 is always substantially equal to the voltage of the standard cell 59, and therefore, there is normally little or no drain from the standard cell 59. When so used, the standard cell 59 may have a very long life. The provision of relay 165 guarantees that the standard cell 59 will only be subjected to normal use. Claims broadly directed to such provision are being presented in an application of Henry M. Schmitt, Serial No. 480,582, filed concurrently herewith.

In order to eliminate the effects of undesired stray alternating or fluctuating currents which may be extraneously induced in the potentiometric network 5 or in the thermocouple 4 and its conducting leads, a condenser 169 is provided between the potentiometer circuit point 50 and ground. With this connection any stray alternating or fluctuating currents which may be induced in the thermocouple circuit or in the potentiometer circuit are by-passed to ground, and their effect upon the operation of the measuring and controlling apparatus is thus materially reduced if not altogether eliminated.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. The combination with a potentiometer circuit comprising a source of current, a slidewire resistance, and a variable resistance, of a device to vary said last mentioned resistance, and means operative continuously in response to the potential drop across said slidewire resistance to actuate said device to maintain a constant potential drop across said slidewire resistance.

2. The combination with a potentiometer circuit comprising a source of current, a slidewire resistance, and a variable resistance, of a movable device to vary said last mentioned resistance, a reversible electrical motor to adjust said movable device, and a device to determine the potential drop across said slidewire resistance and operative continuously in response to the potential drop across said slidewire resistance to actuate said reversible motor in one direction or the other to maintain a constant potential drop across said slidewire resistance.

3. The combination with a potentiometer circuit comprising a source of current, a slidewire resistance, and a variable resistance, of a movable device to vary said last mentioned resistance, and an electronic device to determine the potential drop across said slidewire resistance and operative continuously in response to the potential drop across said slidewire resistance to actuate said movable device to maintain a constant potential drop across said slidewire resistance.

4. The combination with a potentiometer circuit comprising a source of current, a slidewire resistance and a variable resistance, of a movable device to vary said last mentioned resistance, a reversible electrical motor to adjust said movable device, an electronic device having an input circuit and an output circuit, means operative continuously to control the input circuit of said electronic device in accordance with the potential drop across said slidewire resistance, and means connecting the output circuit of said electronic device to said reversible electrical motor for continuously controlling the rotation and direction of rotation of said motor to maintain a constant potential drop across said slidewire resistance.

5. The combination with a potentiometer circuit comprising a source of current, a slidewire resistance and a variable resistance comprising a vernier rheostat having a fine adjustment and a coarse adjustment, of a movable device to vary said last mentioned resistance, a reversible electrical motor to adjust said movable device, an electronic device having an input circuit and an output circuit, means operative continuously to control the input circuit of said electronic device in accordance with the potential drop across said slidewire resistance, and means connecting the output circuit of said electronic device to said reversible electrical motor for continuously controlling the rotation and direction of rotation of said motor to maintain a constant potential drop across said slidewire resistance.

6. A potentiometer comprising a source of unidirectional potential to be measured, a slidewire resistance, a second source of unidirectional potential to produce a potential drop across said slidewire resistance, a variable resistance connected in circuit with said slidewire resistance and said second source of potential to vary the potential drop produced across said slidewire resistance, means to oppose said first mentioned source of potential to at least a portion of the potential drop across said slidewire resistance, a device to vary the portion of the potential drop across said slidewire resistance which is opposed to said first mentioned source of potential, means operative in response to unbalance of said opposed potentials to actuate said device to maintain said opposed potentials equalized, a device to vary said variable resistance, and means operative continuously in response to the potential drop across said slidewire resistance to actuate said second mentioned device to maintain a constant potential drop across said slidewire resistance.

7. A potentiometer comprising a source of unidirectional potential to be measured, a slidewire resistance, a second source of unidirectional potential to produce a potential drop across said slidewire resistance, a variable resistance connected in circuit with said slidewire resistance and said second source of potential to vary the potential drop produced across said slidewire resistance, means to oppose said first mentioned source of potential to at least a portion of the potential drop across said slidewire resistance, means including a reversible electrical motor to vary the portion of the potential drop across said slidewire resistance which is opposed to said first mentioned source of potential, means operative to selectively control said reversible electrical motor for rotation in one direction or the other including means for translating any difference in potential of said opposed potentials into an alternating potential of one phase or of opposite phase depending upon the polarity of the difference potential, means to amplify said alternating potential, and means to apply said alternating potential to said reversible electrical motor, a device to vary said variable resistance, and means operative continuously in response to the potential drop across said slidewire resistance to actuate said device to maintain a constant potential drop across said slidewire resistance.

8. A potentiometer comprising a source of unidirectional potential to be measured, a slidewire resistance, a second source of unidirectional potential to produce a potential drop across said slidewire resistance, a variable resistance connected in circuit with said slidewire resistance and said second source of potential to vary the potential drop produced across said slidewire resistance, means to oppose said first mentioned source of potential to at least a portion of the potential drop across said slidewire resistance, a device to vary the portion of the potential drop across said slidewire resistance which is opposed to said first mentioned source of potential, means operative to actuate said device to maintain the said opposed potentials equalized, a device to vary said variable resistance, a source of substantially constant potential, and means operative continuously to actuate said second mentioned device to maintain a constant potential drop across said slidewire resistance including means for continuously comparing the potential drop across said slidewire resistance to the potential of said source of substantially constant potential and operative to produce an alternating potential of one phase or of opposite phase upon deviation in the potential drop across said slidewire resistance from a predetermined value, means to amplify said derived alternating potential, a reversible electrical motor, and means to apply the amplified alternating potential to said reversible electrical motor to selectively control the latter for rotation in one direction or the other depending upon the phase of the amplified potential.

9. A potentiometer comprising a source of unidirectional potential to be measured, a slidewire resistance, a second source of unidirectional potential to produce a potential drop across said slidewire resistance, a variable resistance connected in circuit with said slidewire resistance and said second source of potential to vary the potential produced across said slidewire resistance, means to oppose said first mentioned source of potential to at least a portion of the potential drop across said slidewire resistance, means including a reversible electrical motor to vary the portion of the potential drop across said slidewire resistance which is opposed to said first mentioned source of potential, means operative to actuate said reversible electrical motor for rotation in one direction or the other to maintain said opposed potentials equalized including means for translating any difference in potential of said opposed potentials into an alternating potential of one phase or of opposite phase depending upon the polarity of the difference potential, means to amplify said alternating potential, and means to apply the amplified alternating potential to said reversible electrical motor, a device to vary said variable resistance, a source of substantially constant potential, and means operative continuously to actuate said device to maintain a constant potential drop across said slidewire resistance including means for continuously comparing the potential drop across said slidewire resistance to the potential of said source of substantial constant potential and operative to produce an alternating potential of one phase or of opposite phase upon deviation in the potential drop across said slidewire resistance from a predetermined value, means to amplify said derived alternating potential, a second reversible electrical motor, and means to apply the amplified alternating potential to said second reversible electrical motor to selectively control the latter for rotation in one direction or the other depending upon the phase of the amplified potential.

10. The combination with a potentiometer circuit comprising a slidewire resistance, and a variable resistance, of a device to vary said last mentioned resistance, a source of substantially constant potential, means operative to compare the potential drop across said slidewire resistance to the potential of said source of substantially constant potential and operative continuously in response to deviation in the potential drop across said slidewire resistance from a predetermined value to actuate said device to maintain a constant potential drop across said slidewire resistance, energizing means for said continuously operative means, and means to prevent the flow of current from said source of substantially constant potential upon failure of said energizing means.

11. The combination with a potentiometer circuit comprising a slidewire resistance, and a variable resistance, of a device to vary said last mentioned resistance, a source of substantially constant potential, a circuit including said slidewire resistance and said source of substantially constant potential, means connected in said circuit to compare the potential drop across said slidewire resistance to the potential of said substantially constant potential and operative continuously in response to deviation in the potential drop across said slidewire resistance from a predetermined value to actuate said device to maintain a constant potential drop across said slidewire resistance, means to energize said continuously operative means, and means responsive to said energizing means to disconnect said source of substantially constant potential from said second mentioned circuit when said energizing means is ineffective to energize said continuously operative means.

12. The combination with a split potentiometer circuit having a branch including a slidewire resistance, a second branch including a source of current and a variable resistance, and a third branch including a fixed resistance, of a device to vary said variable resistance, a source of substantially constant potential, means connecting said source of substantially constant potential to said fixed resistance to oppose the potential of said substantially constant potential to the potential drop across said fixed resistance, means connected to said fixed resistance and to said source of substantially constant potential operative continuously in response to deviations in the potential drop across said fixed resistance to actuate said device to maintain said opposed potentials equalized, means to energize said continuously operative means, and means responsive to said energizing means to open said connection when said energizing means is ineffective to energize said continuously operative means.

13. The combination with a split potentiometer circuit having a branch including a slidewire resistance, a second branch including a source of current and a variable resistance, and a third branch including a fixed resistance, of a device to vary said variable resistance, a source of substantially constant potential, means connecting said source of substantially constant potential to said fixed resistance to oppose the potential of said substantially constant potential to the potential drop across said fixed resistance, and means connected to said fixed resistance and to said source of substantially constant potential operative continuously in response to deviations in the potential drop across said fixed resistance to actuate said device to maintain said opposed potentials equalized.

14. The combination with a potentiometer circuit comprising a slidewire resistance, and a variable resistance, of a device to vary said last mentioned resistance, a source of substantially constant potential, a circuit including said slidewire resistance and said source of substantially constant potential, and means connected in said second mentioned circuit to compare the potential drop across said slidewire resistance to the potential of said substantially constant potential and operative continuously in response to deviation in the potential drop across said slidewire resistance from a predetermined value to actuate said device to maintain a constant potential drop across said slidewire resistance.

15. The combination with a potentiometer circuit comprising a slidewire resistance, and a variable resistance, of a device to vary said last mentioned resistance, a source of substantially constant potential, and means operative to compare the potential drop across said slidewire resistance to the potential of said source of substantially constant potential and operative continuously in response to deviation in the potential drop across said slidewire resistance from a predetermined value to actuate said device to maintain a constant potential drop across said slidewire resistance.

16. Apparatus to control the magnitude of a variable condition at a desired value including means to produce an effect representative of the magnitude of said condition, means to measure the magnitude of said effect having the characteristic of tending to vary in calibration during the operation of said apparatus, means controlled by said measuring means to regulate the magnitude of said condition, and means operative continuously in response to changes in the calibration of said measuring means to recalibrate said measuring means.

17. Apparatus to control the magnitude of a variable condition at a desired value including means to produce an electrical effect representative of the magnitude of said condition, a narrow span potentiometric instrument to measure the magnitude of said electrical effect having the characteristic of tending to vary in calibration during the operation to said apparatus, means controlled by said potentiometric instrument to regulate the magnitude of said condition, and means operative continuously in response to changes in the calibration of said potentiometric instrument to recalibrate said potentiometric instrument.

18. Apparatus to control the magnitude of a variable condition at a desired value including means to produce an electromotive force representative of the magnitude of said condition, a narrow span potentiometric instrument to measure the magnitude of said electromotive force comprising a source of current, a slidewire resistance, a variable resistance, a device to vary said last mentioned resistance, means operative continuously in response to changes in the potential drop across said slidewire resistance to actuate said device to maintain a constant potential drop across said slidewire resistance, and means controlled by said potentiometric instrument to regulate the magnitude of said condition.

19. The combination with a narrow span potentiometer circuit comprising a slidewire resistance, and a variable resistance, of a device to vary said last mentioned resistance, a source of substantially constant potential, and means operative to compare the potential drop across said slidewire resistance to the potential of said source of substantially constant potential and operative continuously in response to deviation in the potential drop across said slidewire resistance from a predetermined value to actuate said device to maintain a constant potential drop across said slidewire resistance.

WALTER P. WILLS.